K. E. OSE.
FEEDING ATTACHMENT FOR THRESHING MACHINES.
APPLICATION FILED JUNE 13, 1908.
945,283.
Patented Jan. 4, 1910.
5 SHEETS—SHEET 1.
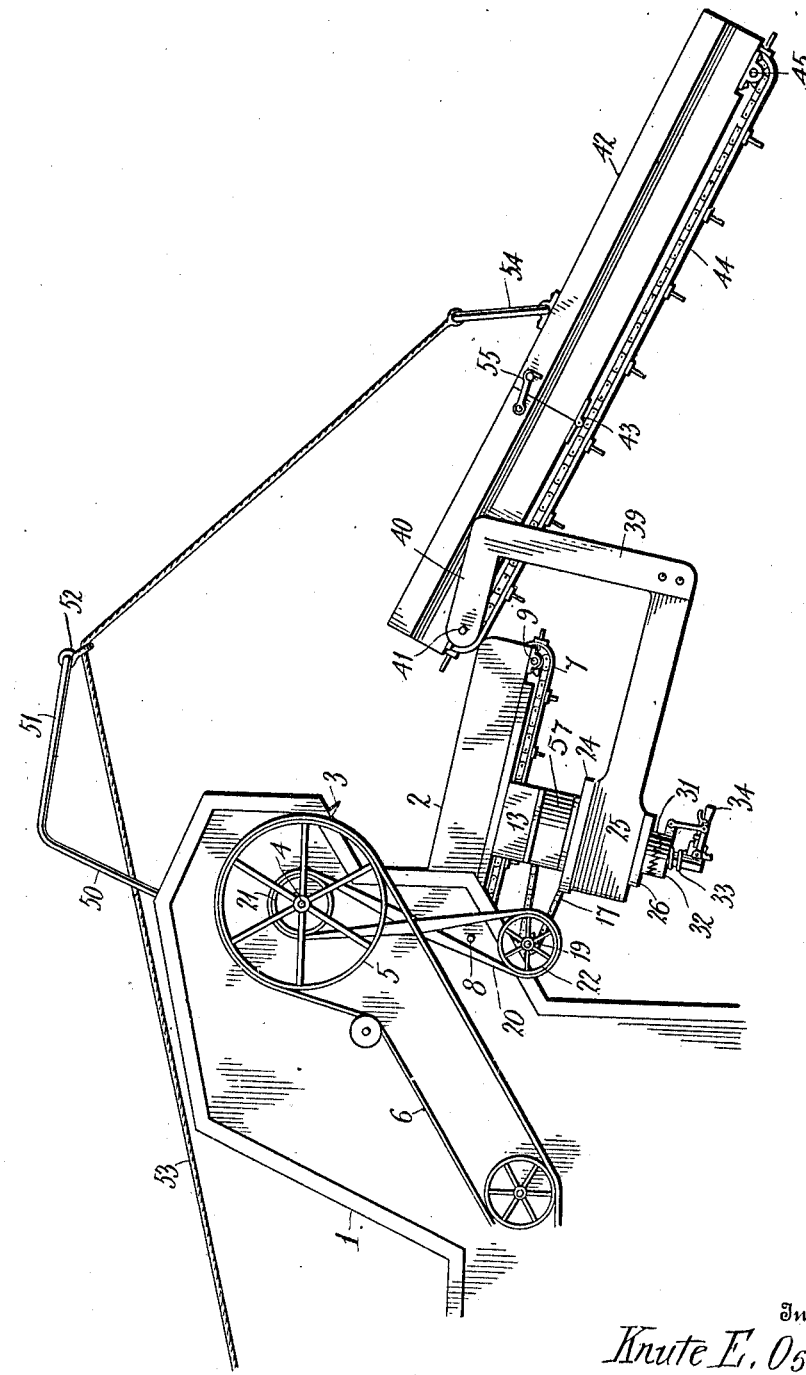
Witnesses
Inventor
Knute E. Ose,
By Chandler & Chandler
Attorneys K. E. OSE.
FEEDING ATTACHMENT FOR THRESHING MACHINES.
APPLICATION FILED JUNE 13, 1908.
945,283.
Patented Jan. 4, 1910.
5 SHEETS—SHEET 2.
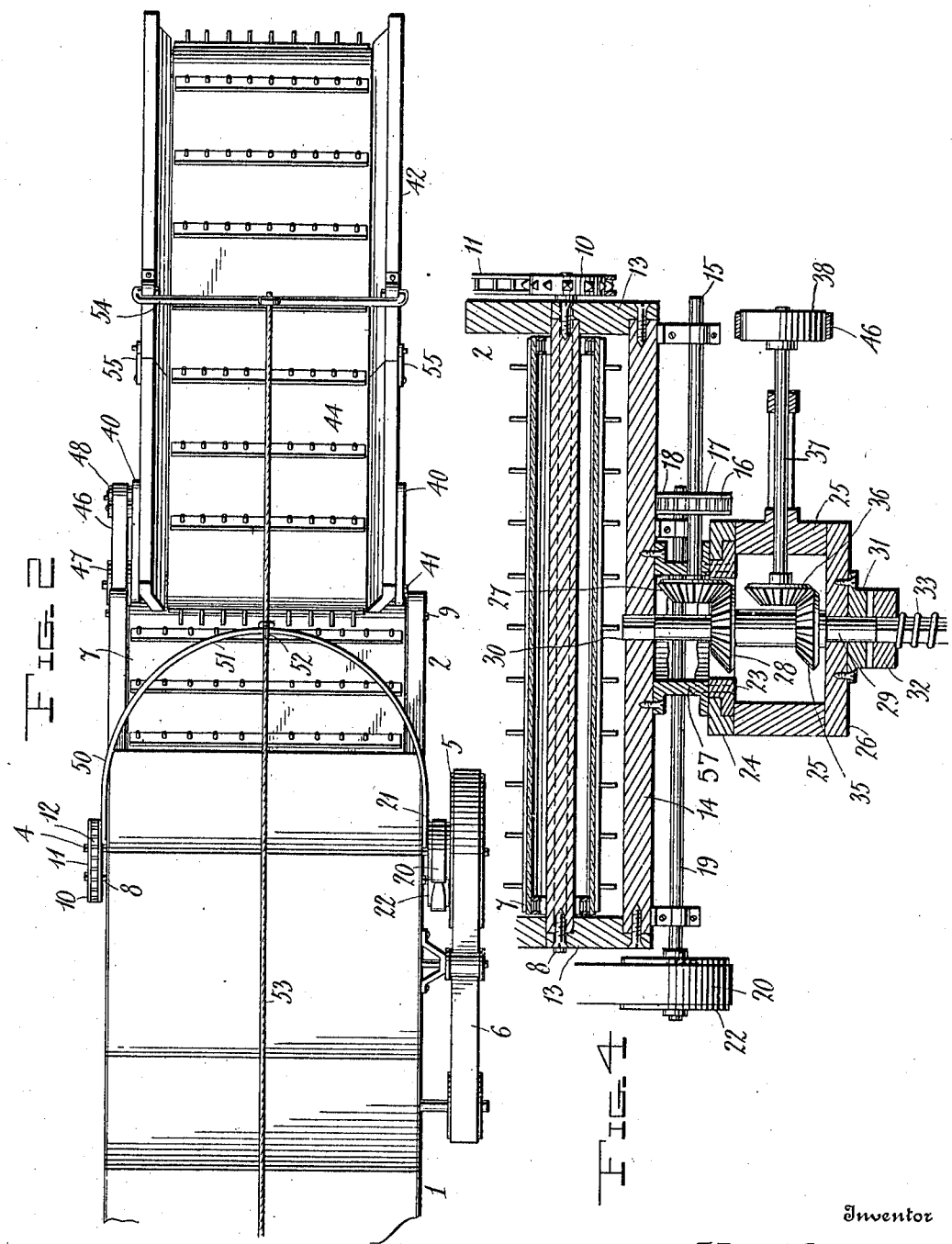

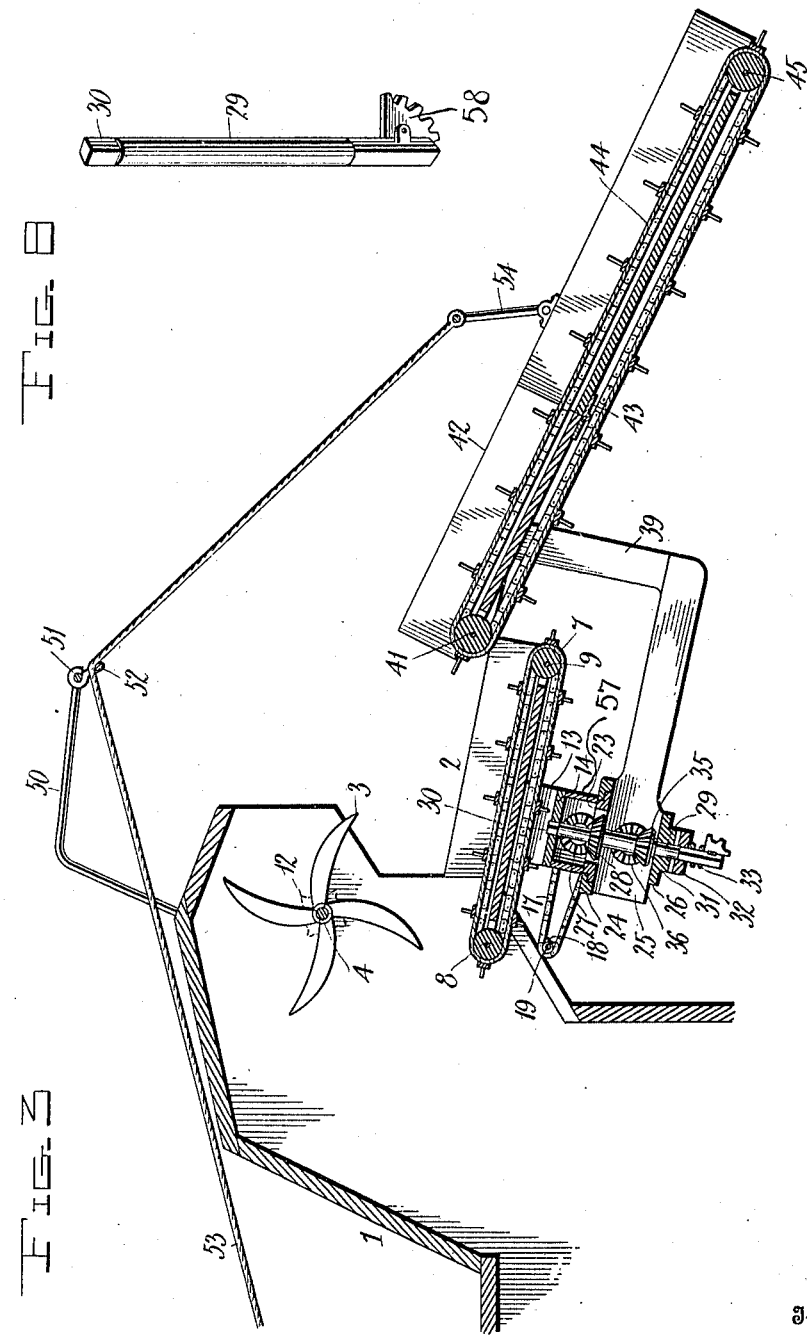

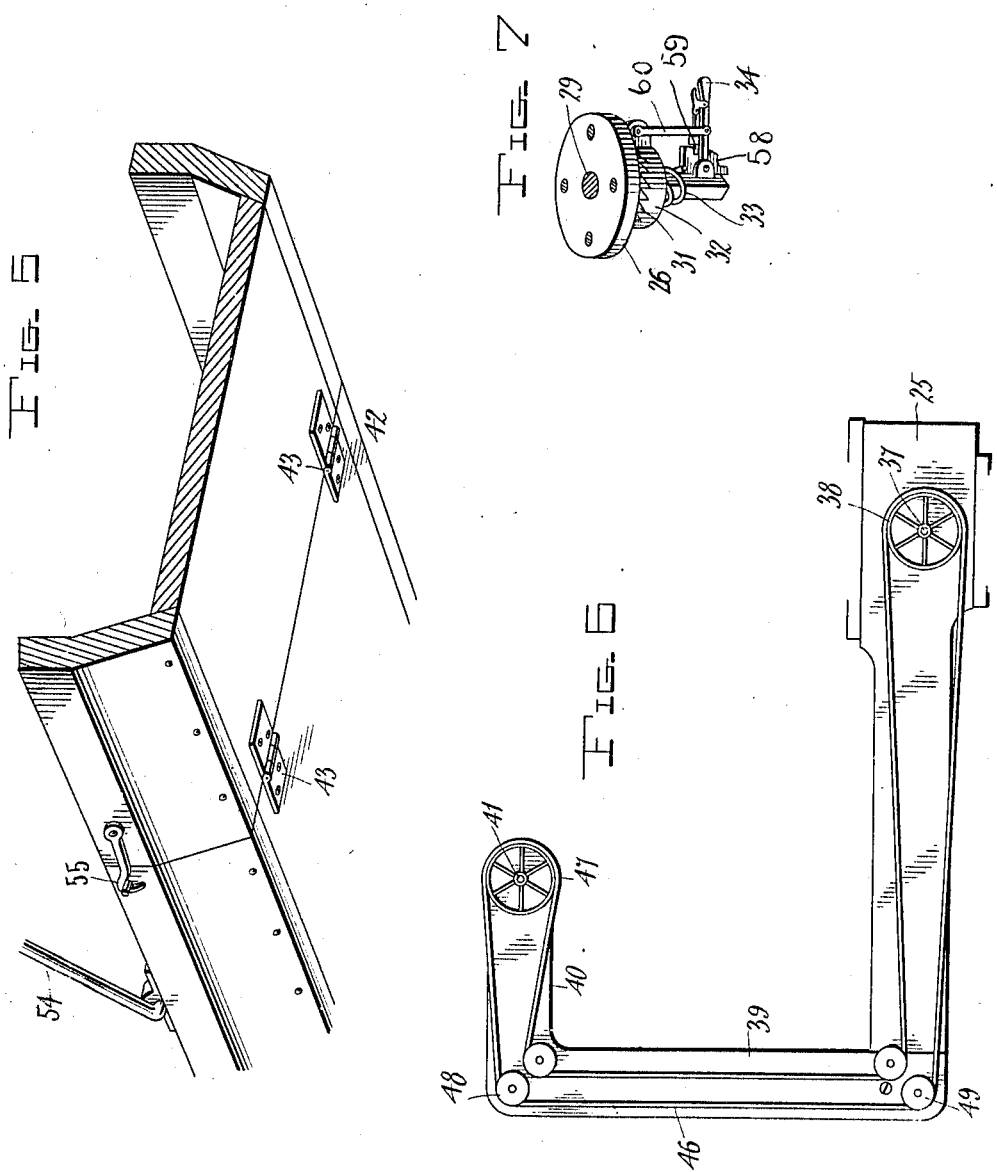

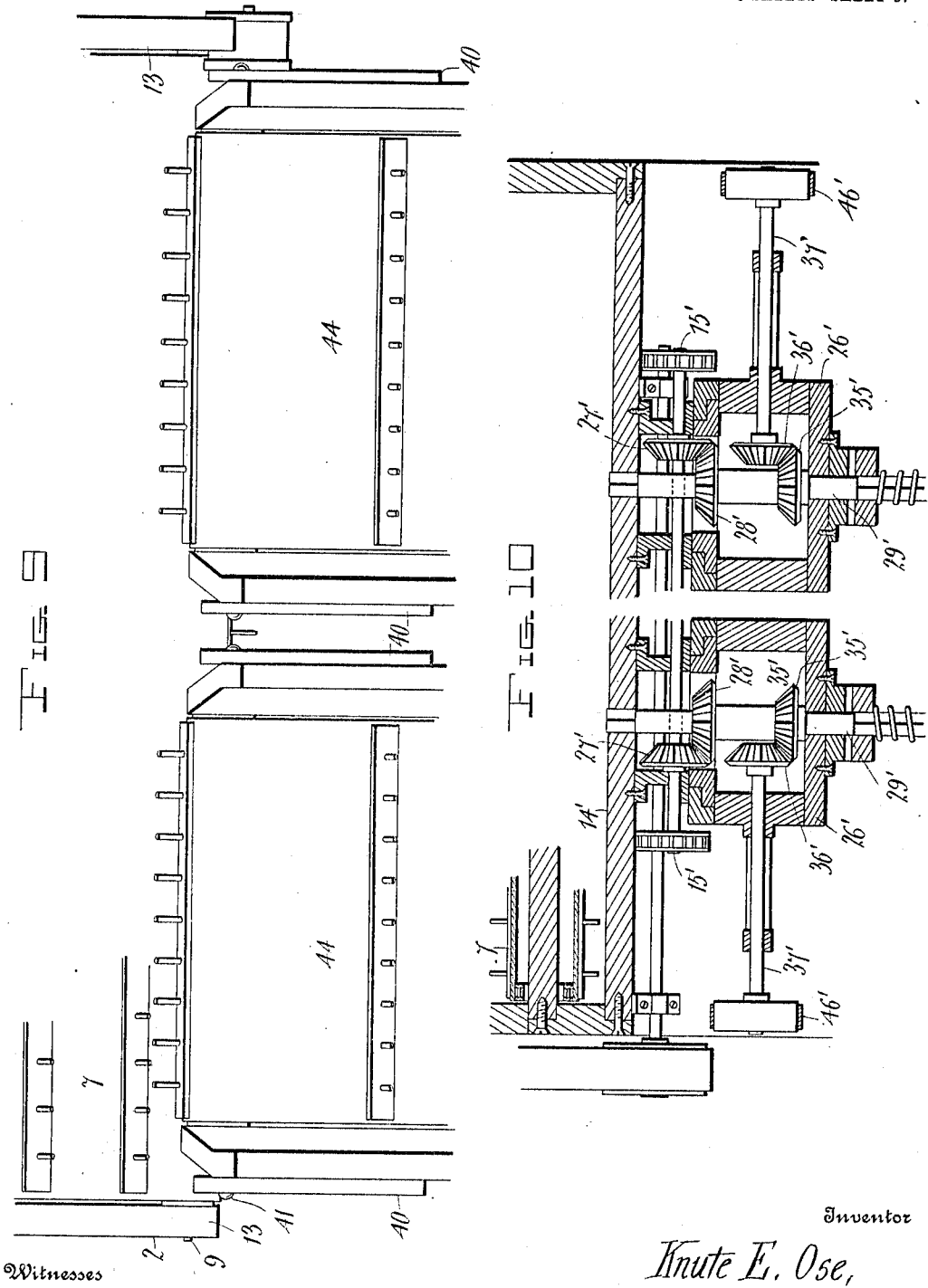

UNITED STATES PATENT OFFICE.

KNUTE E. OSE, OF ECHO, MINNESOTA, ASSIGNOR OF ONE-HALF TO H. O. HAMME, OF ECHO, MINNESOTA.

FEEDING ATTACHMENT FOR THRESHING-MACHINES.

945,283.  Specification of Letters Patent.  Patented Jan. 4, 1910.

Application filed June 13, 1908. Serial No. 438,413.

*To all whom it may concern:*

Be it known that I, KNUTE E. OSE, a citizen of the United States, residing at Echo, in the county of Yellow Medicine, State of Minnesota, have invented certain new and useful Improvements in Feeding Attachments for Threshing-Machines; and I do hereby declare the following to be a full, clear, and exact description of the invention, such as will enable others skilled in the art to which it appertains to make and use the same.

The present invention relates to improvements in feeding attachments for threshing machines, and it has for its primary object the provision of an exceedingly simple and effective feeder which may be readily attached to and supported from a threshing machine of any ordinary type, in such a manner as to permit of its being swung in either direction, to facilitate the delivery thereonto of the grain, the feeder being locked in adjusted position by means of a clutch mechanism.

Further and more especially, the invention resides in the particular construction of the support which carries the swinging feeder and the mechanism for driving the same, the support being in the nature of a turn-table, the movement of which in either direction will vary the angle of the feeder to the carrier at the feed end of the thresher, the trough which carries the feeder being fastened at its upper end between a pair of upstanding arms with which said support is provided.

The invention still further resides in the particular form of mechanism employed for driving the feeder, and in the particular manner in which such mechanism is operatively connected with the drive mechanism of the thresher.

The preferred embodiment of the invention is illustrated in the accompanying drawings, in which corresponding parts are designated by the same reference numerals throughout the several views.

Of the said drawings, Figure 1 is a side elevation of the complete invention. Fig. 2 is a top plan view. Fig. 3 is a longitudinal section through the main and swinging feeders. Fig. 4 is an enlarged transverse section through the main feeder and the support, illustrating the mechanism for driving the swinging feeder. Fig. 5 is a fragmental perspective view of the trough in which the swinging feeder is disposed. Fig. 6 is a detail side elevation of the support. Fig. 7 is a detail view of the clutch mechanism for retaining the support in adjusted position. Fig. 8 is an enlarged detail view of the shaft which carries the clutch members. Fig. 9 is a detail view of a modified form of support. Fig. 10 is a transverse sectional view through Fig. 9.

Referring more particularly to the drawings, 1 designates generally the threshing machine which is of any preferred type and includes a downwardly inclined platform 2 located at the feed end thereof adjacent the knives 3 which latter are carried by the knife shaft 4 whose projecting end has secured thereto a pulley 5 connected by a belt 6 with the main drive shaft of the machine (not shown). Over the platform 2 travels an endless belt conveyer 7, provided with a series of transversely-disposed slats arranged at regular intervals, the movement of said conveyer being effected by means of a pair of spaced sprocket chains to which the longitudinal edges of the conveyer are secured, said chains passing around pairs of sprocket wheels secured to upper and lower shafts 8 and 9 journaled at opposite ends in the vertical sides of the platform, the projecting end of the upper shaft carrying a sprocket 10 connected by a chain 11 with a sprocket 12 secured to the opposite end of the shaft 4 from that upon which the pulley 5 is mounted.

The platform 2 is further provided at opposite sides with depending brackets 13 to which a transversely-disposed beam 14 is secured at opposite ends, said beam being provided in turn with a bearing in which one end of a shaft 15 is journaled, the other end of the shaft being journaled in a bearing formed in a depending collar 57 rigidly secured to the beam and located centrally thereof. This shaft which is disposed longitudinally of the beam, carries a sprocket 16 connected by a chain 17 with a sprocket 18 mounted upon the corresponding end of a shaft 19 journaled in brackets secured to the thresher casing directly below the shaft 4. The shafts 4 and 19 are connected by a crossed belt 20, clearly shown in Fig. 1, which passes around pulleys 21 and 22 secured respectively to said shafts.

The collar 57 fastened to the under face of the beam 14 carries an annular ring 23 which is rigidly secured thereto and has loosely fitted thereupon a plate 24 secured at its side edges to a pair of beams 25 connected together at their lower ends by a cross piece 26, said plate, beams, and cross piece thus forming a turn table, as will be apparent. At its inner end, the shaft 15 carries a bevel gear 27 which meshes with the upper member 28 of a compound bevel gear fitted loosely upon the upper portion of a vertical shaft 29 which is arranged axially of the turn-table and projects through an opening formed in the cross piece 26, said shaft terminating at its upper end in a rectangular head 30 which fits in a similarly-shaped opening formed in the cross-beam 14, by reason of which construction said shaft is held against rotation. The cross-piece 26 has secured to its under face a clutch member 31 provided with an axial opening through which the vertical shaft 29 extends, the portion of said shaft below the clutch member being squared and provided with a clutch member 32 which is slidable thereon and is normally held in engagement with the first mentioned clutch member by an expansible coil spring 33, the lower end of the spring bearing against a rack 58 secured to the lower end of the shaft. This rack is designed to be engaged by a spring-pressed dog 59 carried by a lever 34 pivoted at its inner end to an ear formed upon the lower end of the shaft, said lever being further connected by a link 60 with an ear formed upon the sliding clutch member 32, as shown in Fig. 7. This last mentioned clutch member can thus be moved downwardly out of engagement with the clutch member 31, against the action of the spring by means of the lever, as will be apparent, after which disengagement the turn-table may be rotated in either direction. When the operating device is released, the sliding clutch member will reëngage the fixed clutch member, thus locking the turn table in adjusted position.

The lower member 35 of the compound bevel gear above referred to is arranged to mesh with a bevel gear 36 secured to the inner end of a short horizontal shaft 37 which is journaled centrally in a bearing formed in the adjacent beam 25, the outer end of said shaft carrying a belt pulley 38.

Each of the side beams 25 of the turn table has secured to its forward end an upstanding arm 39 whose upper portion is extended laterally rearward as indicated by the numeral 40, the outer ends of said lateral portions being provided with alining bearing openings in which are journaled the ends of a horizontal shaft 41. This shaft likewise passes through the sides of the rear member of a trough 42, the lower or front member of which is connected to said front member by means of a hinge 43 secured to the lower faces of the bottoms of said members, the provision of the hinge permitting the trough members to be folded together when the feeder carried thereby is inoperative. This feeder, like the main feeder, comprises a transversely-slatted belt 44 to whose longitudinal edges are secured a pair of sprocket chains which pass around pairs of sprockets secured to the shaft 41, and to a similar shaft 45 carried by the lower member of the trough and journaled at opposite ends in the sides thereof.

The rotation of the above-described feeder, hereinafter termed the swinging feeder, is effected by means of a belt 46 which passes around the pulley 38 on the outer end of the shaft 37, and around a pulley 47 secured to the projecting right hand end of the shaft 41, said belt passing between pairs of guide pulleys 48 and 49 rotatably mounted upon lateral pins carried by the right hand arm 39.

From the foregoing, it will be apparent that when the shaft 19 is rotated, through its belt and pulley connection with the shaft 4, the shaft 15 will be simultaneously rotated, thus driving the belt 46 which in turn, effects the movement of the belt 44 of the swinging feeder, which latter may be swung into any desired position, owing to its connection with the turn table, and retained in position, when adjusted by the clutch mechanism above described. The grain delivered to the swinging feeder will thus be fed onto the main feeder which travels over the platform 2, the upper end of the swinging feeder and the bent portions of the arms 39 projecting across said platform as shown. From the main feeder, the grain is delivered to the rotating knives at the feed end of the thresher.

In the form of the invention illustrated in Figs. 9 and 10 two swinging feeders are made use of, each feeder being capable of independent adjustment, so as to permit grain to be fed from two different points to the main feeder. To this end, the shaft 15 shown in the first form of the invention is replaced by a shaft 15′ provided with a pair of bevel gears 27′ arranged in spaced relation to each other, each bevel gear meshing with the upper member 28′ of a compound bevel gear carried by a shaft 29′ upon which the corresponding turn table rotates, the squared head of each shaft fitting in a correspondingly-shaped opening formed in the beam 14′ which carries the shaft 15′ The cross-piece 26′ of each turn table has secured thereto one member of a clutch, the other member of which is carried by the corresponding shaft 29′, as in the preferred form of the invention. The member 35′ of each of the last-mentioned compound gears meshes with a bevel gear 36′ carried by a horizontal shaft 37' which is mounted in the same manner as the shaft 37. Each turn table carries a two-part trough and a belt conveyer which are in every way similar to the trough 42 and belt 44 above described, each belt being driven from the corresponding shaft 37' by a belt 46'. Further description of this form of the invention is therefore considered unnecessary, it being understood that each feeder is capable of an independent adjustment with respect to the main feeder, owing to the provision of its clutch mechanism, the swinging movement of the feeder and the turn table incidental to such adjustment being effected manually in each instance.

The thresher has mounted upon its top at the feed end thereof, a U-shaped bail 50, the bight portion of which is bent laterally to form an arcuate guide 51 upon which an S-shaped bolt 52 is movable. Through said bolt passes a cable 53, one end of which is engaged with a bail 54 disposed transversely of the trough 42, and pivotally connected to the sides of the rear member thereof, the other end of the cable extending toward the discharge end of the thresher. When stress is applied to the last mentioned end of the cable, the trough will be raised or lowered bodily, so as to dispose its feed end above the ground during the passage of the thresher across a field or along a road. During the time that the machine as a whole is in actual operation, the trough members are held against displacement with respect to each other by means of a latch 55 which is pivoted to one of the sides of the upper member and is arranged for engagement with a catch carried by the lower member. In this connection, it may be stated that where two swinging feeders are made use of, the members of each trough are held against displacement by a latch 5, and that the lower member of each trough will be provided with a bail to which one end of a cable is fastened, each cable in such instance passing through a separate bolt carried by the guide portion of the bail 50.

The hinge connection between the members of the trough permits the same to be folded upon each other during the movement of the thresher.

Further description of the operation of the invention is deemed unnecessary, it being understood that modifications and changes may obviously be made within the scope of the appended claims.

What is claimed is:

1. The combination, with a supporting platform, of a turn-table carried thereby; a feeder carried by and supported wholly from the turn-table and movable therewith; and a clutch mechanism connected with the platform and the turn-table, for locking the latter against rotation, to retain the feeder in adjusted position with respect to said platform.

2. The combination, with a supporting platform, and a depending member connected therewith, of a turn-table rotatable upon said member; a feeder carried by and supported wholly from the turn-table and movable bodily therewith; a clutch member secured to the turn-table; a clutch member slidable upon said depending member; and means for holding said clutch members in engagement with each other, to lock the turn-table against rotation and retain the feeder in adjusted position with respect to said platform.

3. The combination, with a supporting platform, a transverse shaft carried thereby, and means for driving said shaft, of a vertical shaft carried by the platform; a turn-table rotatable upon said vertical shaft; an endless conveyer carried by and supported wholly from the turn-table and movable therewith; a gear carried by said transverse shaft; a compound gear rotatable upon said vertical shaft and having one member thereof in mesh with the first-mentioned gear; a shaft carried by the turn-table and provided with a gear in mesh with the other member of the compound gear; inter-engaging devices carried by the vertical shaft and the turn-table, for locking the latter against rotation, to retain the conveyer in adjusted position with respect to the platform; and connections between the first-mentioned and last-mentioned shafts, for driving the conveyer.

4. The combination, with a supporting platform, a transverse shaft carried thereby, and means for driving said shaft, of a vertical shaft carried by the platform; a turn-table rotatable upon said vertical shaft; an endless conveyer carried by and supported wholly from the turn-table and movable therewith; a gear carried by said transverse shaft; a compound gear rotatable upon said vertical shaft and having one member thereof in mesh with the first-mentioned gear; a shaft carried by the turn-table and provided with a gear in mesh with the other member of the compound gear; a clutch member secured to the turn-table; a clutch member slidable upon said vertical shaft; and means for holding said clutch members in engagement with each other, to lock the turn-table against rotation and retain the feeder in adjusted position with respect to said platform.

5. The combination, with a supporting platform, an endless conveyer movable thereover, and means for driving the conveyer, of a turn-table carried by the platform and provided with a pair of spaced vertical arms having their upper ends bent laterally so as to overhang said conveyer; a shaft journaled in said bent ends; means for driving said shaft; and an endless conveyer carried by and supported wholly from the turn-table and movable bodily therewith, said conveyer having its delivery end passing around said shaft, whereby said end extends directly over the first mentioned conveyer.

6. The combination, with a supporting platform, an endless conveyer movable thereover, and means for driving the conveyer, of a turn-table carried by the platform and provided with a pair of spaced vertical arms having their upper ends bent laterally, so as to overhang said conveyer; a shaft journaled in said bent ends; means for driving said shaft; an endless conveyer carried by and supported wholly from the turn-table and movable bodily therewith, said conveyer having its delivery end passing around said shaft whereby said end extends directly over the first mentioned conveyer; and means for locking the turn-table against rotation, to retain the last-mentioned conveyer in adjusted position with respect to the first-mentioned conveyer.

7. The combination, with an inclined trough, and means for supporting the same, said trough comprising upper and lower members hinged together at their mutually-adjacent inner ends; means carried by one of said members and arranged for engagement with the other member, to hold said members against movement with respect to each other; a bail pivoted to the lower member; an endless conveyer movable within the trough; means for driving the conveyer; and a cable secured at one end to the bail, for adjusting the inclination of the trough.

In testimony whereof, I affix my signature, in presence of two witnesses.

KNUTE E. OSE.

Witnesses:
F. W. SOMMERFELD,
HENRY C. DOMEIER.